US010141144B2

(12) United States Patent
Zhuang et al.

(10) Patent No.: US 10,141,144 B2
(45) Date of Patent: Nov. 27, 2018

(54) SELF-POWERED SWITCHES AND RELATED METHODS

(71) Applicant: Eaton Intelligent Power Limited, Dublin (IE)

(72) Inventors: Alex Zhuang, Shanghai (CN); George Zhang, Shanghai (CN); Erik Jeffrey Gouhl, Fayetteville, GA (US); Harry Zhang, Shanghai (CN); Andrew Yang, Jiangsu (CN); Darron Kirby Lacey, Peachtree City, GA (US); Tom Xiong, Shanghai (CN)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/427,814

(22) Filed: Feb. 8, 2017

(65) Prior Publication Data
US 2018/0226215 A1    Aug. 9, 2018

(51) Int. Cl.
*H01H 13/04*  (2006.01)
*H01H 50/02*  (2006.01)
*H01H 50/16*  (2006.01)
*H01H 50/44*  (2006.01)
*H01H 49/00*  (2006.01)

(52) U.S. Cl.
CPC .......... *H01H 50/021* (2013.01); *H01H 49/00* (2013.01); *H01H 50/16* (2013.01); *H01H 50/44* (2013.01); *H01H 2239/00* (2013.01)

(58) Field of Classification Search
CPC .............................. H91H 21/22; H01H 11/00
USPC .......................................................... 335/202
See application file for complete search history.

(56) References Cited

U.S. PATENT DOCUMENTS

| 2,793,265 | A | * | 5/1957 | Crissinger | H01H 36/008 200/404 |
| 2,866,873 | A | * | 12/1958 | Lamb | H01H 53/015 200/56 R |
| 3,170,999 | A | * | 2/1965 | Brown | H01H 36/00 200/404 |
| 3,946,347 | A | * | 3/1976 | Sauer | H01H 51/2227 335/125 |
| 4,091,346 | A | * | 5/1978 | Nishimura | H01H 50/043 335/202 |

(Continued)

OTHER PUBLICATIONS

Leviton "No Wires, No Batteries, No Limits: Wireless Sensing Solution" *Product Brochure* (7 pages) (2008).

(Continued)

*Primary Examiner* — Shawki S Ismail
*Assistant Examiner* — Lisa Homza
(74) *Attorney, Agent, or Firm* — Myers Bigel, P.A.

(57) ABSTRACT

Self-powered switches include an externally accessible user input member, a switch housing attached to the user input member, a permanent magnet held in the switch housing, a magnet housing held in the switch housing that is attached to the user input member, the magnet housing having a spindle that extends laterally outward from opposing sides of an upper portion of the magnet housing. The spindle is attached to the switch housing. The switches also include a magnet assembly that includes a coil and a shaft extending a distance beyond the coil held in the switch housing. A least one of the magnet assembly and permanent magnet moves in response to movement of the user input member.

20 Claims, 16 Drawing Sheets

(56) References Cited

U.S. PATENT DOCUMENTS

| | | | | |
|---|---|---|---|---|
| 4,292,615 A * | 9/1981 | Ohashi | ................ | H01C 10/103 335/205 |
| 4,344,103 A * | 8/1982 | Nagamoto | ............ | H01H 51/24 335/133 |
| 4,489,297 A * | 12/1984 | Haydon | ............ | H01H 36/0073 200/404 |
| 4,492,942 A * | 1/1985 | Mueller | ................ | H01H 50/18 335/202 |
| 4,669,804 A | 6/1987 | Munroe | | |
| 4,734,669 A * | 3/1988 | Maenishi | ........... | H01H 51/2209 335/132 |
| 5,189,259 A | 2/1993 | Carson et al. | | |
| 5,696,350 A | 12/1997 | Anker | | |
| 5,895,888 A | 4/1999 | Arenas et al. | | |
| 5,934,451 A * | 8/1999 | Yu | ........................ | H01H 9/182 116/286 |
| 6,259,340 B1 * | 7/2001 | Fuhr | ................... | H01H 71/128 335/18 |
| 6,657,144 B2 | 12/2003 | Savicki, Jr. et al. | | |
| 6,891,117 B1 * | 5/2005 | Gouhl | ................ | H01H 23/205 200/339 |
| 6,911,884 B2 * | 6/2005 | Uotome | ................ | H01H 47/06 335/132 |
| 6,960,972 B2 * | 11/2005 | Nakamura | ............ | H01H 50/10 335/128 |
| 7,034,236 B2 | 4/2006 | Endres et al. | | |
| D534,875 S | 1/2007 | Wu | | |
| D576,962 S | 9/2008 | Kidman | | |
| D583,335 S | 12/2008 | Ni | | |
| 7,482,534 B2 | 1/2009 | Ye | | |
| 7,595,460 B1 * | 9/2009 | Dodal | ................... | H01H 23/08 200/339 |
| 7,595,712 B2 * | 9/2009 | Nishino | ................ | G05G 9/047 200/302.3 |
| 7,667,155 B1 | 2/2010 | Ni et al. | | |
| 7,872,551 B2 * | 1/2011 | Nakamura | ........... | H01H 50/041 200/16 R |
| 7,960,651 B2 | 6/2011 | Alderson et al. | | |
| 8,138,872 B2 * | 3/2012 | Yoshihara | ............ | H01F 7/1615 335/124 |
| 8,284,003 B2 * | 10/2012 | Klossek | ................... | G05G 5/05 335/205 |
| 8,459,812 B2 | 6/2013 | Wu et al. | | |
| 8,592,681 B2 * | 11/2013 | Alderson | ............... | H01H 13/86 174/66 |
| 8,658,893 B1 | 2/2014 | Shotey et al. | | |
| 8,674,796 B2 * | 3/2014 | Ito | ............................ | H01H 1/20 335/126 |
| 8,853,893 B2 | 10/2014 | Savicki, Jr. et al. | | |
| 8,947,183 B2 * | 2/2015 | Yano | ........................ | H01H 1/66 335/202 |
| D735,378 S | 7/2015 | Mozdzer | | |
| 9,240,269 B2 * | 1/2016 | Polack | ................. | H01F 7/1638 |
| D777,685 S * | 1/2017 | Tannous | ....................... | D13/169 |
| 9,691,573 B2 | 6/2017 | Dhote et al. | | |
| 2004/0174287 A1 | 9/2004 | Deak | | |
| 2006/0091984 A1* | 5/2006 | Schmidt | ................. | H02K 35/04 335/78 |
| 2009/0078484 A1* | 3/2009 | Kocijan | .................. | B60L 13/04 180/167 |
| 2010/0052830 A1* | 3/2010 | Shinoura | .............. | H01H 43/022 335/202 |
| 2010/0060394 A1* | 3/2010 | Nagura | .................. | H01H 9/443 335/189 |
| 2010/0182109 A1* | 7/2010 | Kuo | ..................... | H01H 51/229 335/78 |
| 2011/0032059 A1* | 2/2011 | Ito | ............................ | H01H 9/34 335/202 |
| 2014/0158510 A1* | 6/2014 | Lacey | .................... | H01H 21/22 200/339 |
| 2014/0251774 A1* | 9/2014 | Gouhl | ...................... | H01H 1/50 200/401 |
| 2015/0115967 A1* | 4/2015 | Maier | ................. | H01H 23/006 324/418 |
| 2015/0357133 A1 | 12/2015 | Keirstead et al. | | |
| 2016/0204686 A1 | 7/2016 | Liu | | |

OTHER PUBLICATIONS

Leviton "Self-Powered Lighting Control Solutions by LevNet RF" *Product Brochure* (2 pages) (2010).
Leviton "Self-Powered Wireless Controls" www.leviton.com (3 pages) (date unknown; printed from the internet Jan. 13, 2017).
U.S. Appl. No. 29/593,417, filed Feb. 8, 2017, Zhuang et al.
U.S. Appl. No. 15/427,951, filed Feb. 8, 2017, Zhuang et al.

* cited by examiner

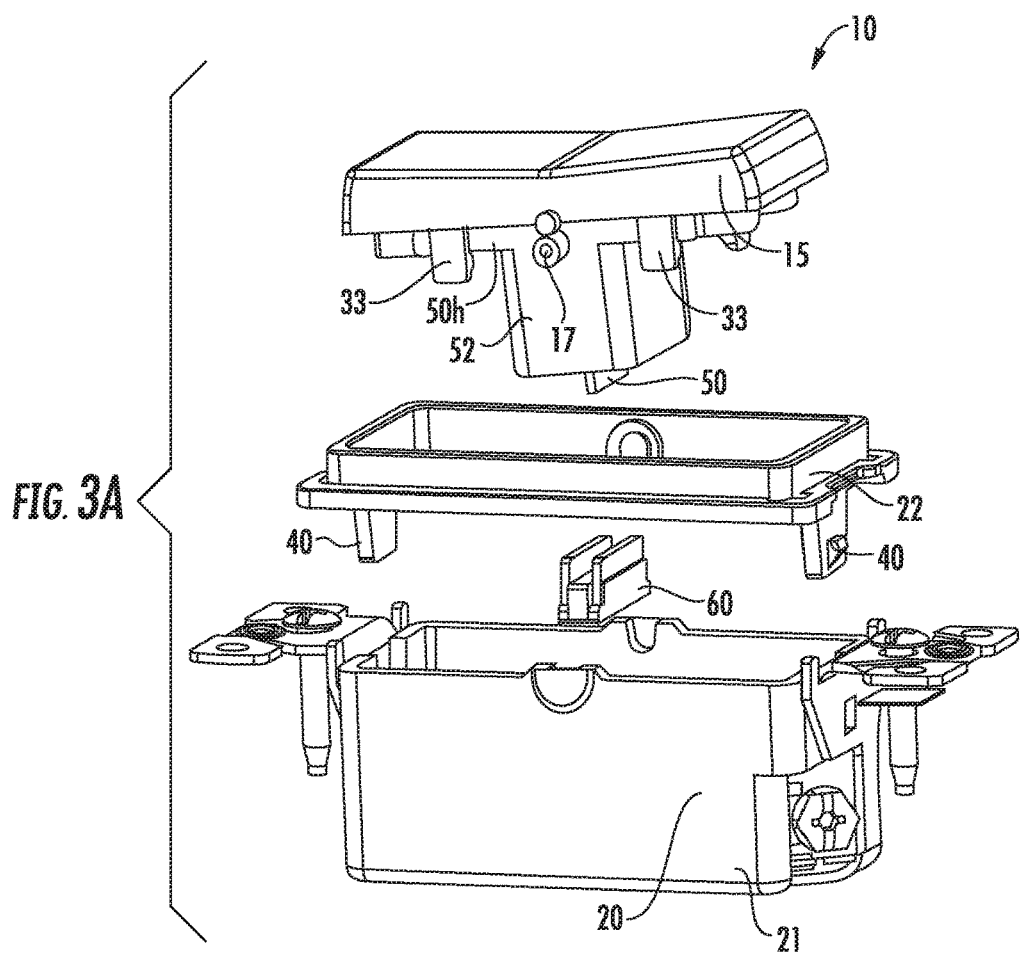
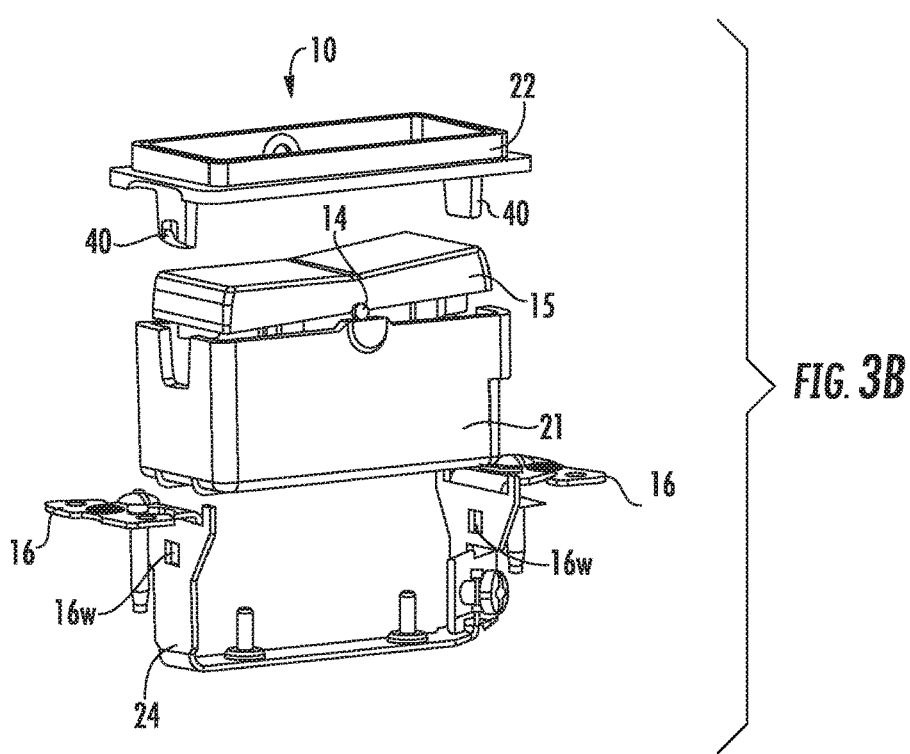

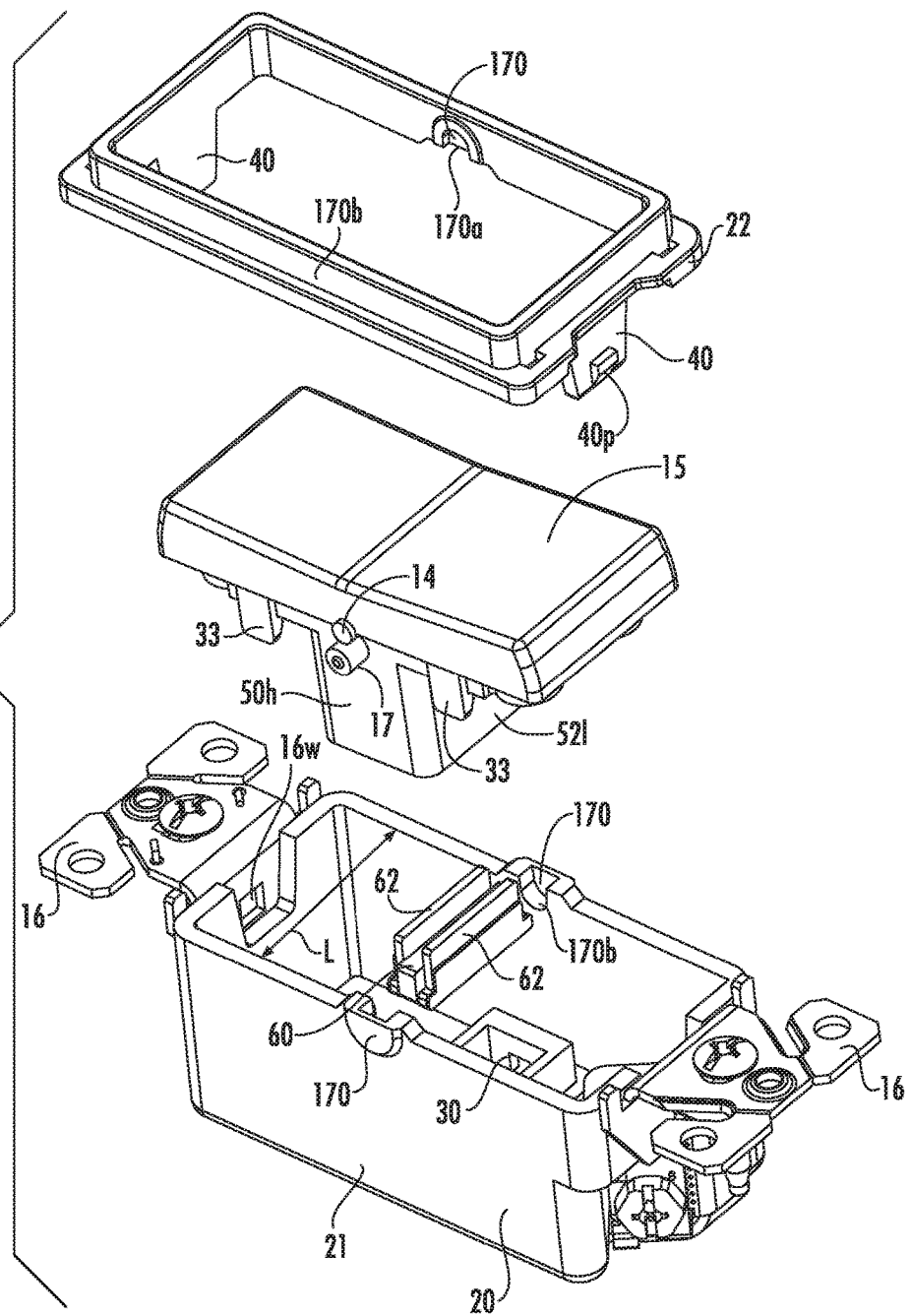

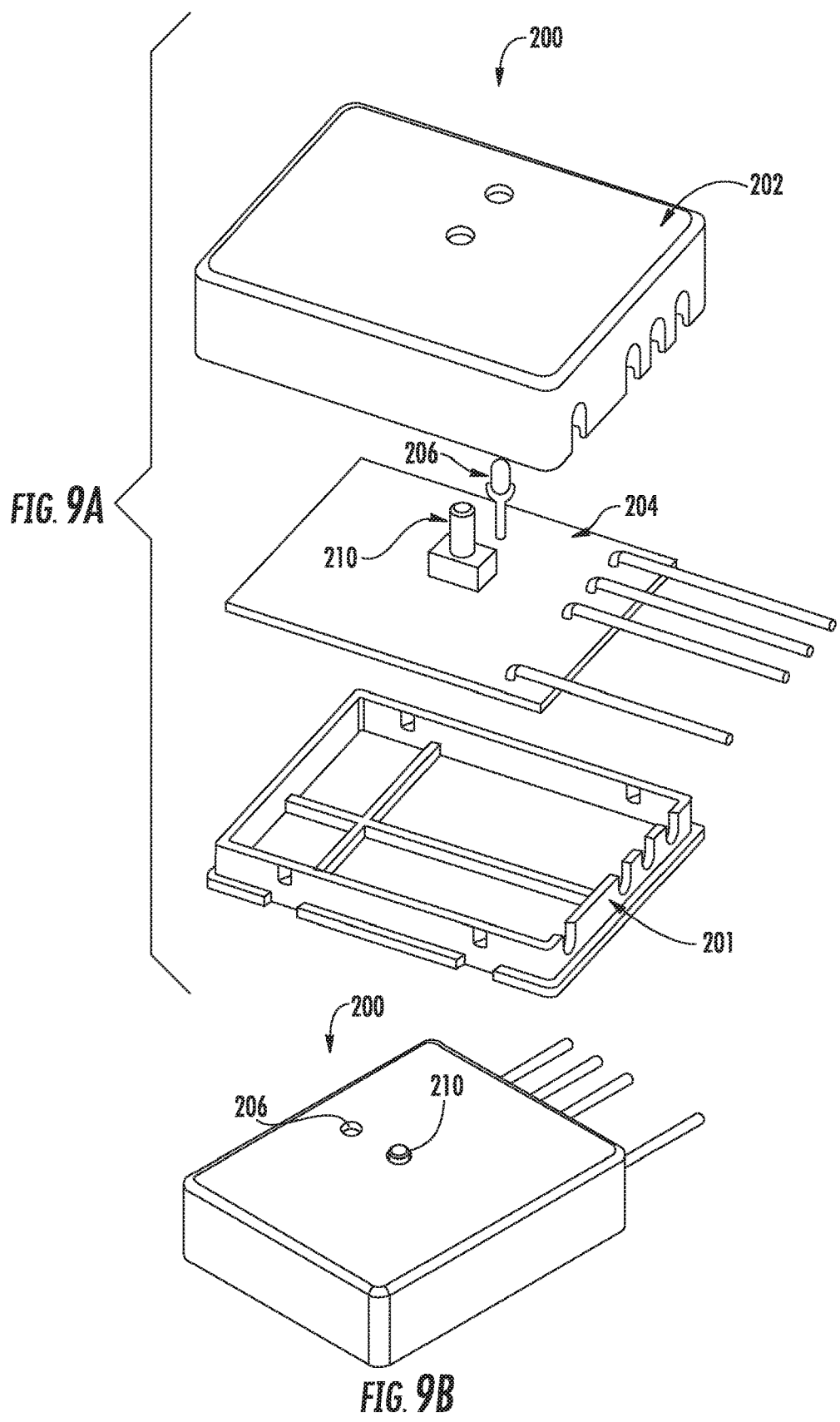

SELF-POWERED SWITCHES AND RELATED METHODS

FIELD OF THE INVENTION

The present invention relates to switches.

BACKGROUND OF THE INVENTION

Conventional switches that wirelessly control a variety of electrical devices require battery or hard-wired connections to a power source.

SUMMARY OF EMBODIMENTS OF THE INVENTION

Embodiments of the present invention are directed to self-powered switches that can be used to wirelessly control electrical devices without requiring battery power or a wired connection to an external power source.

Embodiments of the present invention are directed to self-powered switches that include: an externally accessible user input member; a switch housing attached to the user input member; a permanent magnet held in the switch housing; and a magnet housing held in the switch housing. The magnet housing is attached to the user input member and pivotably attached to the switch housing via at least one spindle. The switch also includes a magnet assembly with a coil and a shaft extending a distance beyond the coil held in the switch housing. At least one of the magnet assembly and permanent magnet moves in response to movement of the user input member to thereby induce a voltage to power a transmitter associated with the switch.

The at least one spindle can extend laterally outward from opposing sides of an upper portion of the magnet housing and engages receiving channels in opposing sidewalls of the switch housing.

The switch can also include at least one circuit board in the switch housing and comprising first and second electrical connections attached to first and second terminals of the coil.

The user input member can be a toggle that can pivot relative to the switch housing about the at least one spindle. The toggle can have a perimeter comprising a pair of long sides and a pair of short sides. The at least one spindle can be provided as laterally outwardly extending spindle segments that extend outward from a medial segment of opposing sides of the magnet housing.

The user input member can be visually transmissive. The user input member can include laterally outwardly extending shaft segments residing adjacent spindle segments of the at least one spindle.

The user input member can be affixed to the magnet housing and can define a unitary sub-assembly therewith so that the magnet housing and user input member pivot in concert about the at least one spindle between on and off positions of the switch.

The magnet housing can have a rectangular cavity that holds a printed circuit board with a transmitter under the user input member that can be seen through the user input member.

The coil can have a perimeter with a pair of opposing long sides joined by a pair of opposing short sides. The shaft can be an elongate plate that extends through the coil. The permanent magnet can include or be a rare earth magnet.

The switch housing can be rectangular and can have mounting brackets extending off each long end. The switch housing can be an in-wall mountable housing.

The at least one circuit board can include a circuit board that is held by the magnet housing above the shaft and under the user input member. The at least one circuit board can include an energy harvesting circuit in electrical communication with the coil terminals and at least one capacitor for storing voltage sufficient to power the transmitter. The transmitter can be in wireless communication with a remote receiver associated with an electrical appliance.

The housing can include a bottom housing with a magnet cradle held therein and a mid-housing that is attached to the bottom housing under the user input member. The mid-housing and bottom housing can have arcuate recesses that align and face each other to form laterally spaced apart and opposing pairs of circular channels that hold spindle segments of the at least one spindle.

The magnet housing can have a rectangular primary body that holds the coil and shaft therein. The at least one spindle can have laterally spaced apart first and second spindle segments that extend outward from the magnet housing. The user input member can have laterally spaced apart first and second shaft segments that are adjacent the first and second spindle segments.

The magnet housing can hold the magnet assembly with the coil and shaft. The permanent magnet can be held between spaced apart first and second plates that rise a distance above the permanent magnet to provide a cavity above the permanent magnet in the switch housing. An end of the shaft extends into the cavity and serially pivots to contact inner surfaces of the first and second plates to alter magnetic flux from the coil to the permanent magnet in response to movement of the user input member.

The switch can have a top member and a bottom member held in the magnet housing. The top member and bottom member can hold the coil therebetween. The top member and bottom member can have channels that align with a coil channel to provide a shaft channel that allows the shaft to extend below the bottom member a distance into the cavity. The top member can have at least one coil terminal aperture through which the coil terminals extend to connect to power input terminals on a printed circuit board.

The switch can have a top member and a bottom member held in the magnet housing. The top member and bottom member can hold the coil of the magnet assembly therebetween. The top member and bottom member can have channels that align with a coil channel to provide a shaft channel that allows the shaft to extend below the bottom member a distance into the cavity. The top member can have at least one coil terminal aperture through which first and second terminals of the coil extend. The switch can also include and first and second magnet yoke members held in the magnet housing that attach to the top member and the bottom member on opposing sides of the coil.

The switch housing can have a mid-housing and a bottom housing. The user input member can have a perimeter with a pair of long sides and a pair of short sides. The user input member also comprises a plurality of attachment members extending from the long and short sides that engage the magnet housing. The mid housing can have a rectangular perimeter with a pair of long sides joined by a pair of short sides that surround a rectangular open interior space. The mid housing can have first and second attachment members that extend off opposing short sides thereof that attach to the bottom housing.

The permanent magnet can be a rare earth magnet that is rectangular with a pair of long sides joined by a pair of short sides. The long sides can extend in a lateral dimension of the switch housing across between 50-100% of a lateral extent of the switch housing.

Other embodiments are directed to methods of assembling a self-powered switch. The methods include: providing a user input member; providing a magnet housing comprising a spindle; providing a switch housing; and attaching the spindle to the switch housing then attaching the user input member to the magnet housing or attaching the user input member to the magnet housing then attaching the spindle to the switch housing.

The magnet housing can hold a coil and a shaft extending through the coil and the switch housing holds a permanent magnet. Optionally, the user input member can be visually transmissive.

The magnet housing can hold a permanent magnet and the switch housing can hold a coil and a shaft extending through the coil. Optionally, the user input member is visually transmissive.

The attaching the spindle can be carried out by inserting laterally extending spindle segments into recesses in opposing sidewalls of the housing.

The magnet housing can have a printed circuit board held above the magnet housing and can be attached to coil terminals of a coil held in the magnet housing.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 3A is a side perspective partially exploded view of the exemplary switch shown in FIG. 1.

FIG. 3B is another side perspective partially exploded view of the exemplary switch shown in FIG. 1.

FIG. 5A is a top, partially exploded view of the device shown in FIG. 1.

FIG. 9A is a side perspective exploded view of a receiver that wirelessly communicates with the self-powered switch according to embodiments of the present invention.

FIG. 9B is a side perspective assembled view of the receiver shown in FIG. 9A according to embodiments of the present invention.

DETAILED DESCRIPTION OF EMBODIMENTS OF THE INVENTION

Figure 1:
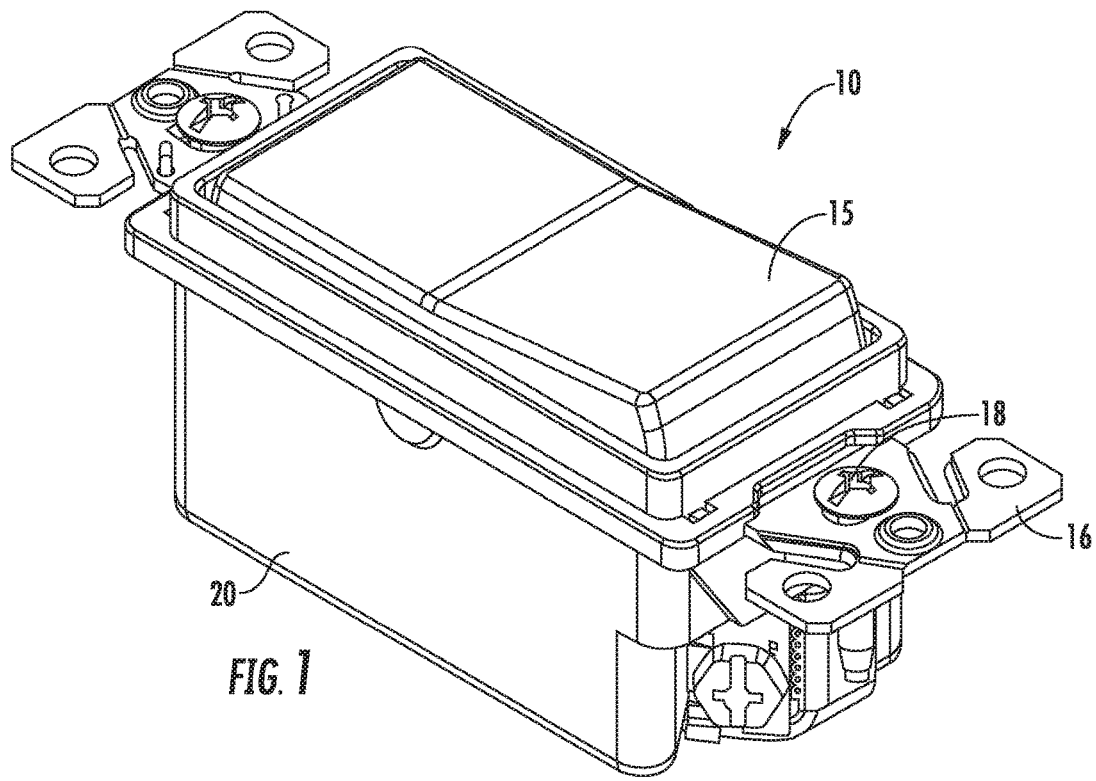
FIG. 1 is a front, side perspective view of an exemplary self-powered switch assembly according to embodiments of the present invention.

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 10, 10', 10", 10'''). Abbreviated versions of the word "Figure" such as "FIG." and "Fig." are used interchangeably in the application. Broken line boxes in the figures indicate optional features.

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The term "about" refers to numbers in a range of +/−20% of the noted value.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Figure 2:
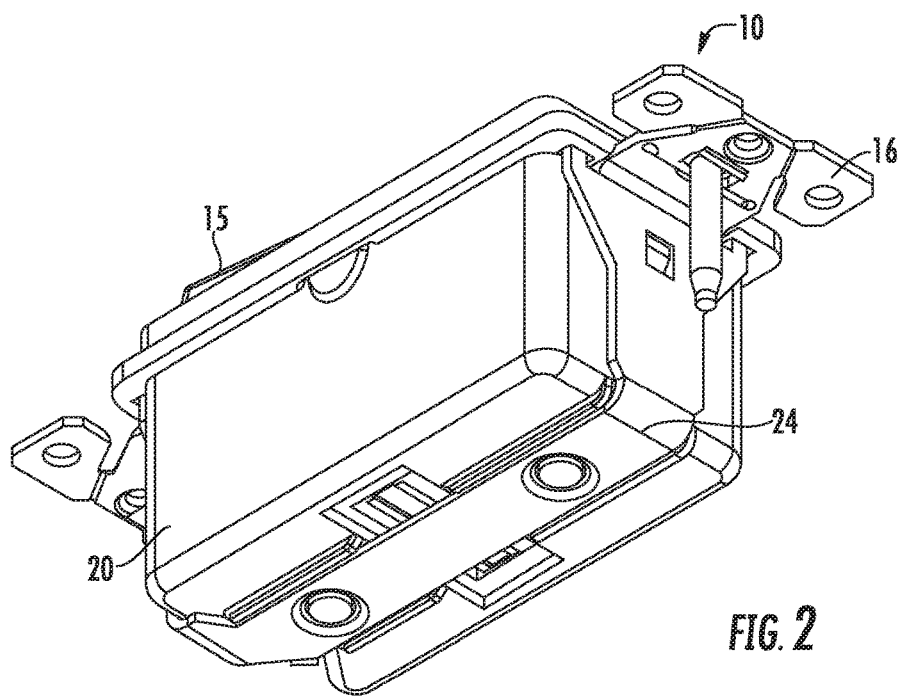
FIG. 2 is side, bottom perspective view of the switch shown in FIG. 1.

Turning now to the figures, FIG. 1 and FIG. 2 illustrate an exemplary self-powered switch 10. The switch 10 can be a switch that controls electrical devices such as ON and OFF controls for appliances, televisions, lights, garage door openers and the like. The switch 10 can wirelessly control the electrical device, typically a remote electrical device.

Figure 4A:
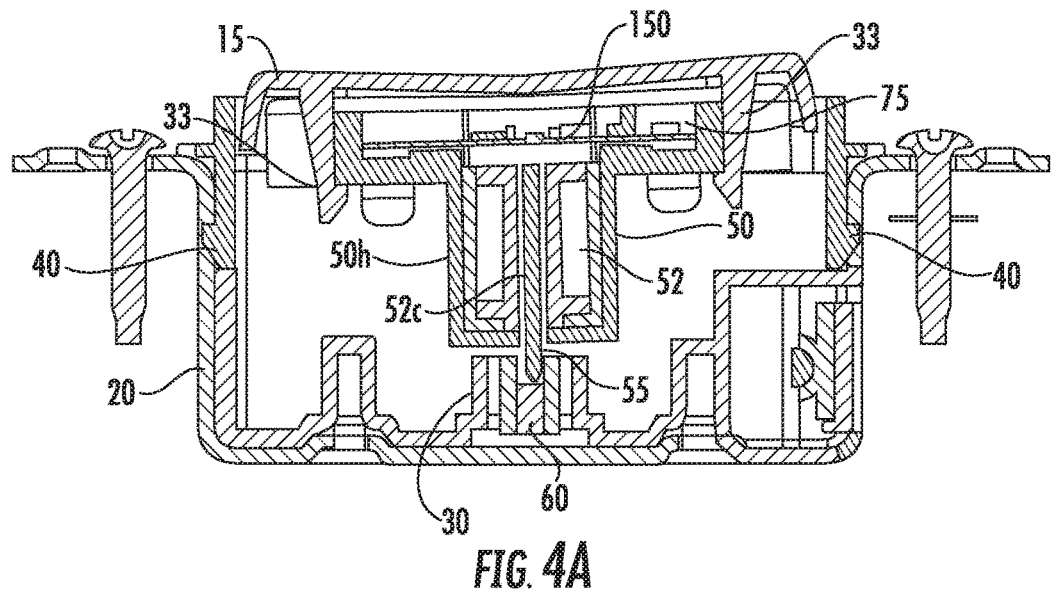
FIG. 4A is a side, section assembled view of the device shown in FIG. 1 according to embodiments of the present invention.
Figure 4B:
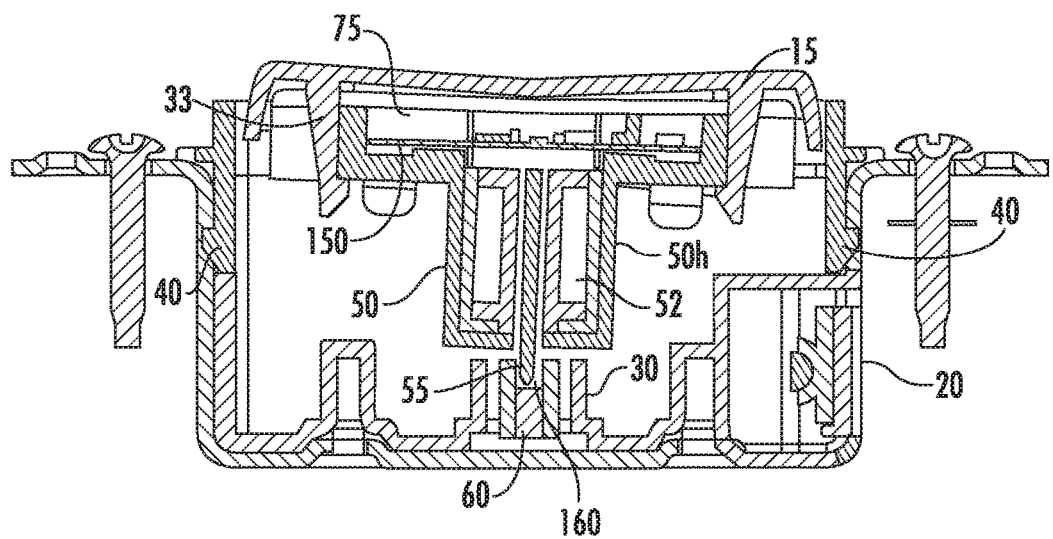
FIG. 4B is a side, section assembled view of the device shown in FIG. 1 with the shaft pivoted to alter magnetic field lines according to embodiments of the present invention.

The switch 10 can have an externally accessible user input member 15, shown as a paddle push button (also known as a "toggle") with first and second end portions that rock between different, i.e., on and off, positions (shown by the arrow in FIG. 4A, for example).

Figure 10:
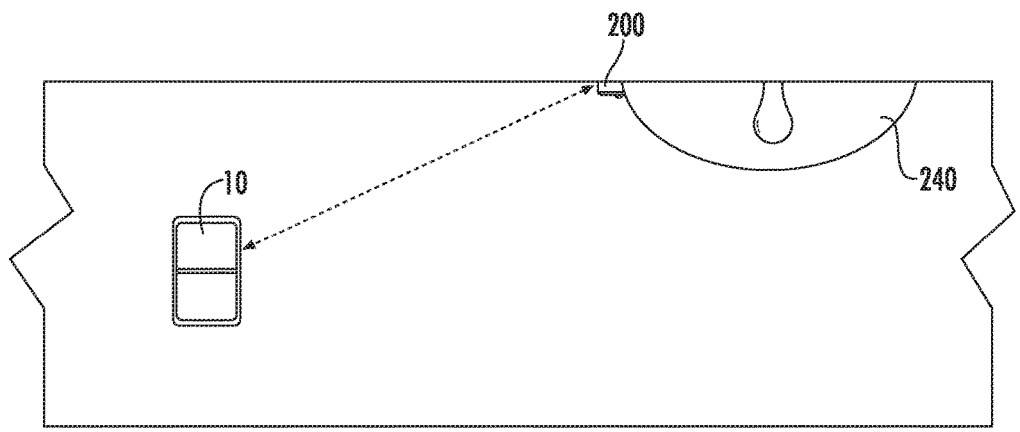
FIG. 10 is a schematic illustration of an in-wall mounted self-powered light switch and a light with a receiver according to embodiments of the present invention.

The switch 10 can be configured, for example, as an in-floor device, in-wall device, surface-mount device, or a device integrated into another device or even as an OFF/ON control for an appliance. As shown in FIGS. 1 and 2, the switch 10 has a housing 20, and at least one mounting bracket 16, shown as two mounting brackets, one extending off each end portion, that can engage one or more fixation members 18 such as screws to mount to a target structure, and an optional strap 24 which may be metal and/or a ground strap. The embodiment shown in FIG. 1 and FIG. 2 may be particularly suitable as an in-wall, optionally flush-mount surface switch that can wirelessly control a remote electrical appliance or device, such as a light 240 via a remote receiver 200 (FIGS. 9A, 9B and 10).

Referring to FIGS. 3A, 3B, 4A and 4B, the housing 20 can include a bottom housing 21 and a cooperating mid-housing 22 that are attached together. The mid-housing 22 can reside between the user input member 15 and the bottom housing 21. The switch 10 also includes a magnet assembly 50 with an internal magnet housing 50*h* residing under the user input member 15 and holding a wire coil 52 and shaft 55 extending through the coil 52. The end portion of the shaft 55*e* can face a permanent magnet 60 held in the bottom housing 21. The permanent magnet 60 can be held in a cradle 30 in the bottom housing 21. The user input member 15 can include inwardly extending brackets 33 that attach to the magnet housing 50*h*. The brackets 33 can comprise a plurality of longitudinally spaced apart brackets 33 that extend from each long side of the user input member 15. The brackets 33 can frictionally engage the magnet housing 50*h*.

Referring to FIGS. 3A, 3B, 4A, 4B and 5A, the mid-housing 22 can include inwardly extending brackets 40 that attach to the bottom housing 21. The brackets 40 can extend from ends (short sides) of the mid-housing 22. The brackets 40 can include outwardly extending protrusions 40*p* that can engage a window 16*w* in the strap 23 of the mounting bracket 16. The mounting bracket 16 can be metal. The housing 20 may be polymeric or metal.

Figure 7A:
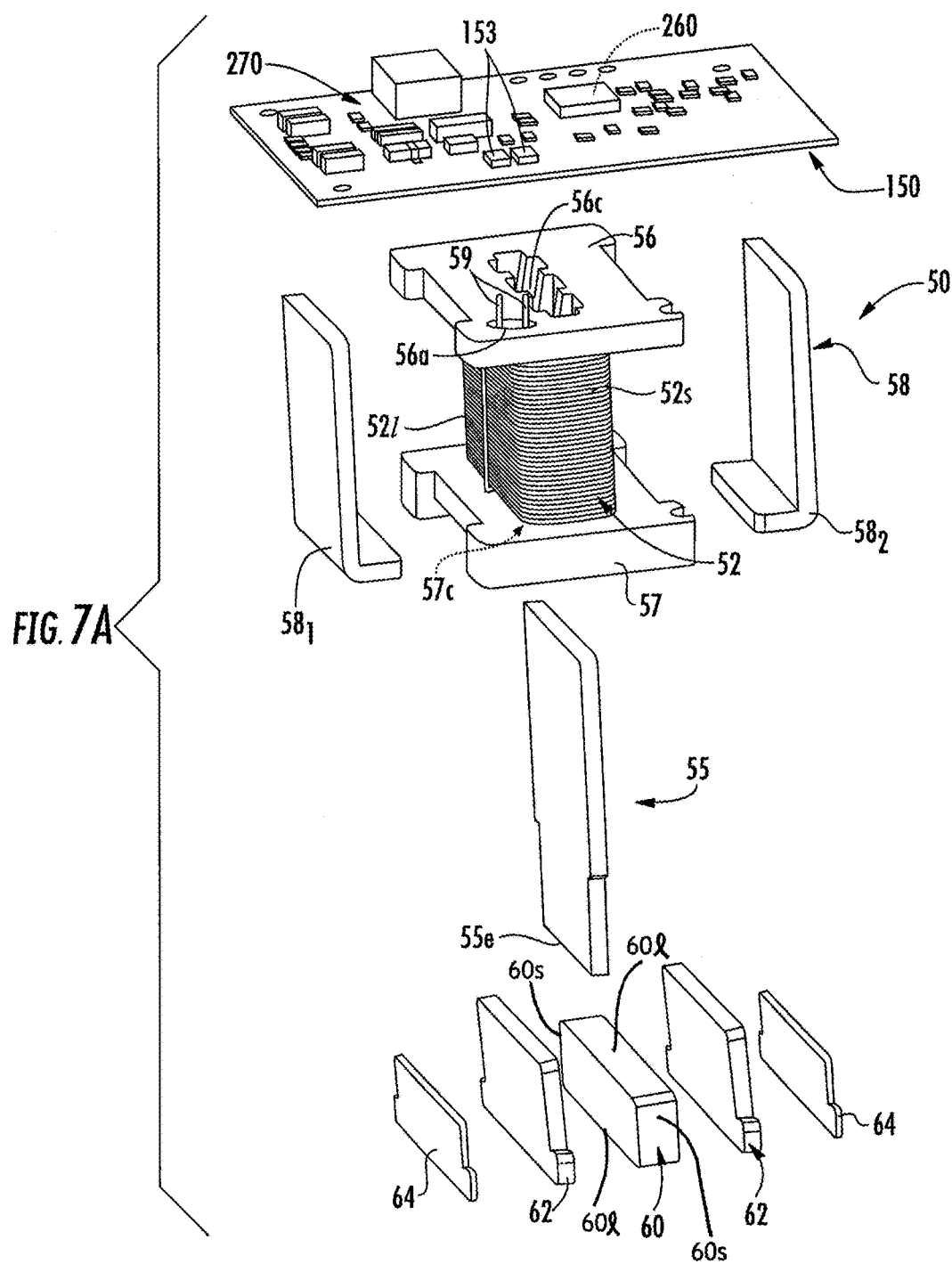
FIG. 7A is a side partially exploded view of internal components of the switch shown in FIG. 1 according to embodiments of the present invention.

The shaft 55 can be a ferromagnetic (i.e., steel) shaft of any suitable shape. As shown in FIG. 7A, the shaft 55 is a planar plate which can have a polygonal shape, typically having a pair of long sides and a pair of short sides with one of the short sides providing the end 55*e* that faces the permanent magnet 60.

Still referring to FIG. 7A, the coil 52 can include a pair of long sides 52*l* joined by a pair of short sides 52*s* and can have a number of adjacent, stacked coil turns N, where N is typically between 10 and 10,000. The coil 52 can have an open center channel 52*c* surrounded by the long and short sides 52*l*, 52*s* that the shaft 55 extends through. In particular embodiments, the long sides have a length that is between 2×-4× greater than the length of the short sides.

The permanent magnet 60 can comprise a rare earth magnet, such as, for example, a neodymium magnet (also known as a NdFeB magnet), made from an allow of neodymium, iron and boron. Particular examples of rare earth magnets that may be suitable for the permanent magnet 60 include $Nd_2Fe_{14}B$, $SmCo_5$ and $Sm(Co,Fe,Cu,Zr)_7$. As shown in FIG. 7A, the permanent magnet 60 can have a rectangular shape with a long side 60*l* facing the shaft end 55*e* and extending laterally across the housing 20. The magnet 60 can be rectangular with a pair of long sides 60*l* joined by a pair of short sides 60*s*.

As shown in FIGS. 3B, 4A, 4B, and 5A-5E, for example, the magnet housing 50*h* can be attached to the user input member 15. The magnet housing 50*h* can include or engage a laterally outwardly extending spindle 17 that is pivotably attached to the switch housing 20 to be able to pivot with the user input member 15. As shown, the spindle 17 extends out from the housing 50*h* and resides in opposing side channels 170 of the switch housing 20. The spindle 17 can comprise first and second spindle segments (rather than a continuous length member) and can extend outward under opposing long sides of the user input member 15 to pivotably engage the channels 170. The spindle 17 can alternatively extend inward from sidewalls of the switch housing 20 and the magnet housing 50*h* can have the cooperating receiving channels 170.

Figure 3C:
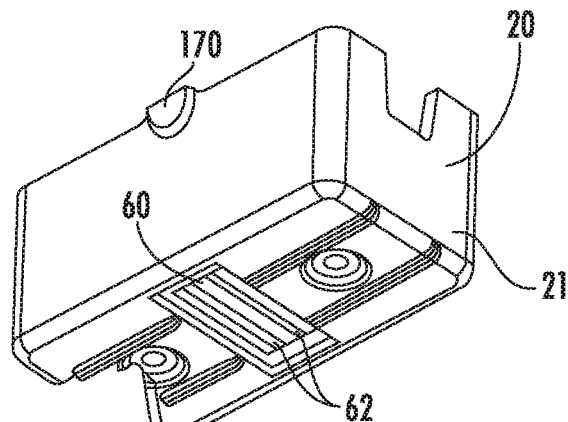
FIG. 3C is a bottom perspective view of the (bottom) switch housing of the switch shown in FIG. 3B according to embodiments of the present invention.
Figure 3D:
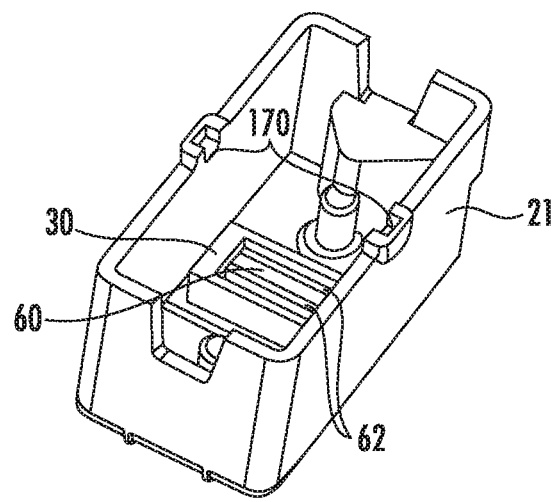
FIG. 3D is a top perspective view of the switch housing shown in FIG. 3C.

The side channels 170 in the switch housing 20, as shown in FIGS. 3C and 3D, can be bearing channels for the spindle 17. The side channels 170 can be formed by cooperating pairs of arcuate channels 170a, 170b that face each other and that reside in the mid housing 22 and the bottom housing 21, respectively.

FIGS. 3B and 5A-5E show that the user input member 15 may include laterally extending shaft segments 14 that reside adjacent the spindle 17 and which can extend laterally outward a shorter distance than the spindle 17. The shaft segments 14 and spindle segments 17 can each reside in a common channel portion of the switch housing, i.e., within pairs of the cooperating channels 170a, 170b.

Referring to FIGS. 4A, 4B, 5B, 5C, 6A and 6B, the switch 10 can also include at least one circuit board 150, which may comprise a flexible and/or a rigid printed circuit board. The at least one circuit board 150 can include power connections 153 to extensions 59 (defining first and second coil terminals 59) of the coil 52 and can hold a transmitter 260 and a power-generation harvesting circuit 270 (FIG. 7A). The at least one circuit board 150 can reside under the user input member 15, typically in a cavity 75 above the shaft 55 (in the orientation shown in FIGS. 3A, 4A and 4B, for example). The cavity 75 can be provided between a planar portion of the magnet coil housing 50h adjacent and under the user input member 15.

Figure 6A:
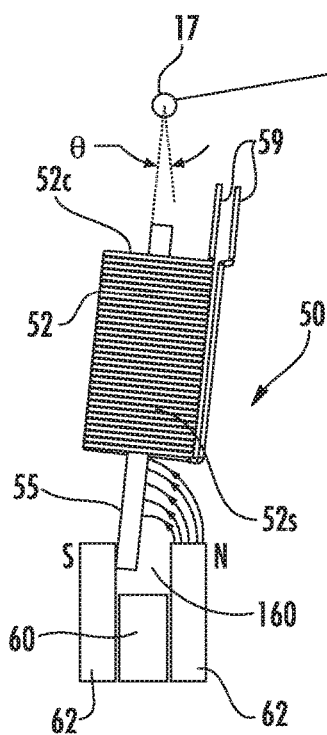
FIGS. 6A and 6B are enlarged schematic illustrations of different positions of the coil and permanent magnet for a self-powered switch according to embodiments of the present invention.
Figure 6B:
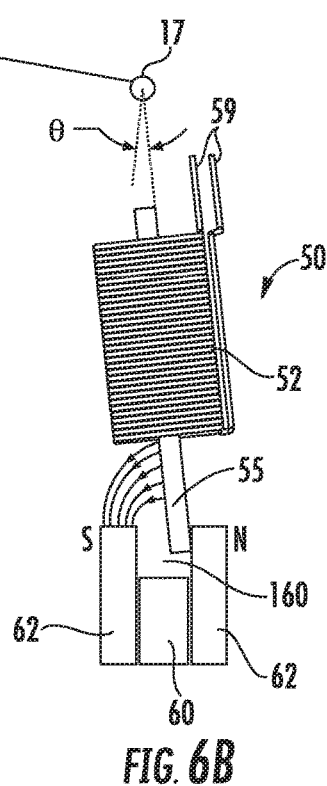

Referring to FIGS. 4A, 4B, 6A and 6B, for example, the magnet housing 50h can pivot about the spindle 17 as a unit with the user input member 15 to move the end of the shaft 55e side to side in a cavity 160 above the permanent magnet 60. The pivoting action causes the centerline of the shaft to change in angular orientation an angular distance θ that can be between 10-40 degrees, typically 10-30 degrees, to pivot the end of the shaft 55e to contact opposing inner surfaces of plates 62 which extend a short distance above the permanent magnet 60. The plates 62 can be ferromagnetic, i.e., steel, conductive plates 62 and can alter flux lines between the coil 52 and the N, S poles of the permanent magnet 60 as shown in FIG. 6A, 6B. The magnetic pole orientation can be provided in the reverse from that shown. The plates 62 can have other shapes and are not required to be planar.

Figure 7B:
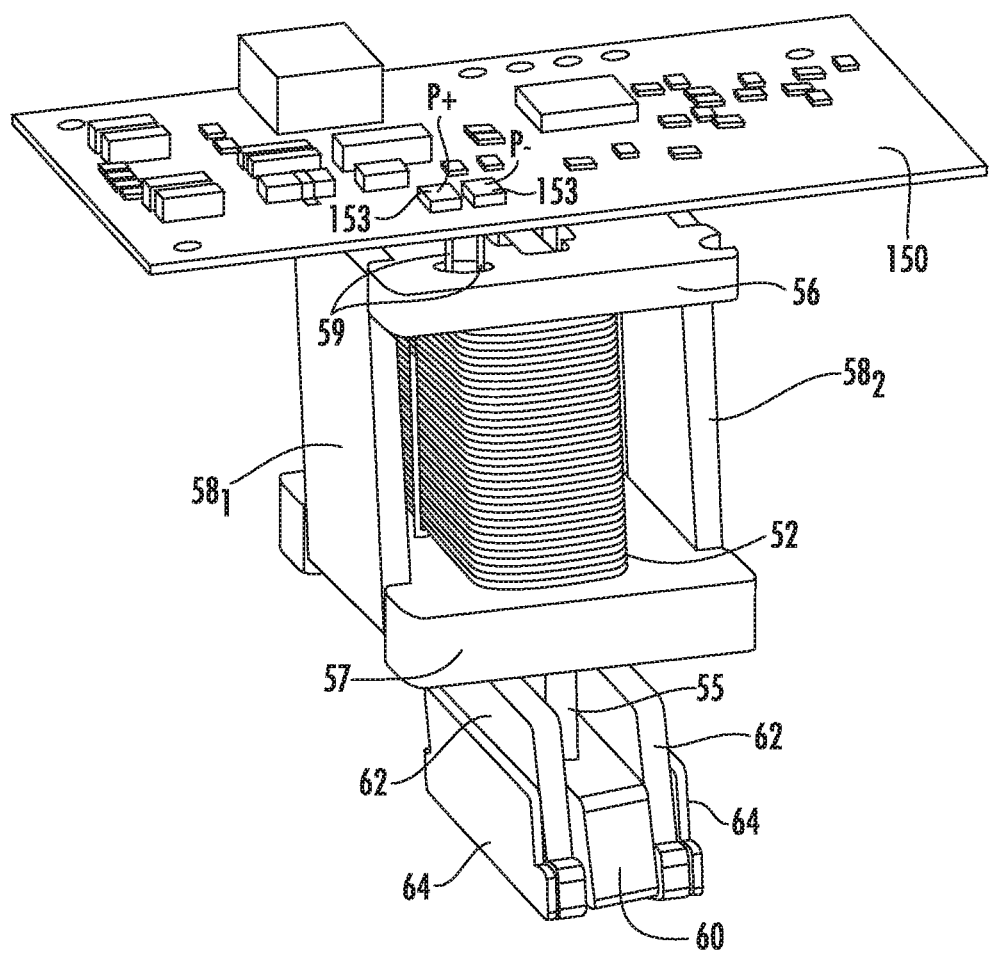
FIG. 7B is a side perspective assembled view of the internal components shown in FIG. 7A.

FIGS. 7A and 7B illustrate exemplary embodiments of the magnet assembly 50 and the permanent magnet 60 with cooperating components such as the plates 62 and thinner, shorter shim plates 64 that can be used to adjust the distance of the N-S poles from the end of the shaft 55e.

The permanent magnet 60 can be rectangular with a pair of long sides joined by a pair of short sides and, as shown in FIG. 7A, the long sides can extend in a lateral dimension of the switch housing across between 50-100% of a lateral extent L of the switch housing 20, more typically between 75-100% of the lateral extent.

Figure 5B:
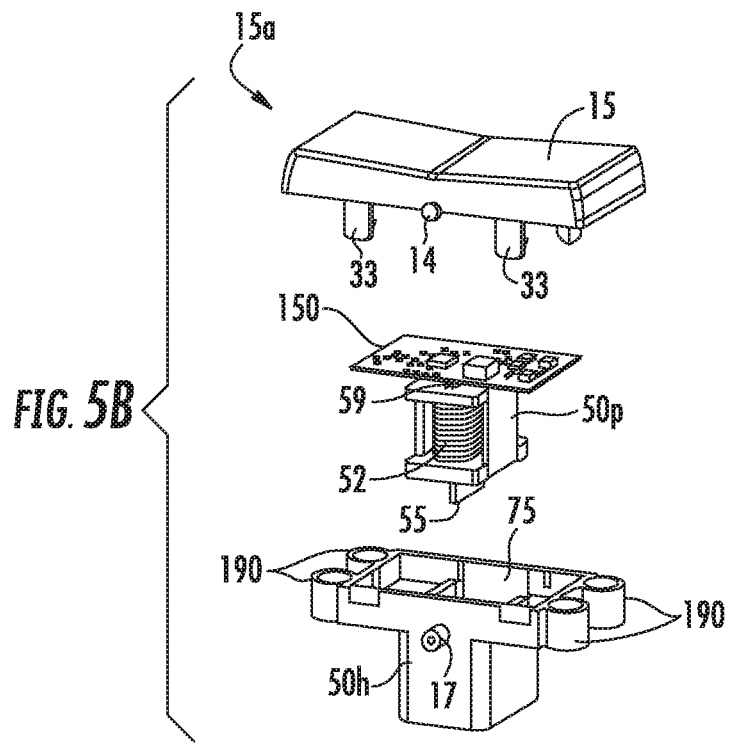
FIG. 5B is a side partially exploded view of a toggle and magnet housing sub-assembly for the switch shown in FIG. 5A according to embodiments of the present invention.

Referring to FIGS. 5B, 7A, and 7B, the at least one circuit board 150 can comprise the power inputs 153 that connect to the terminals/extensions 59 of the coil 52. The coil 52 can be held between longitudinally spaced apart first and second end members 56, 57 that have channels 56c, 57c through which the shaft 55 extends. The first end member 56 can also include at least one aperture 56a that the terminals 59 can be routed through to attach to the power inputs/connections 153 on the at least one circuit board 150. The channel 56c of the first member 56 can frictionally engage the top end portion of the shaft 55t facing the user input member 15. However, other attachment configurations may be used. The magnet assembly 50 can also include a magnet yoke 58, shown as comprising first and second yoke members $58_1$, $58_2$ that attach to the first and second end members 56, 57 (FIG. 7B).

The magnet assembly 50 can be held in the magnet housing 50h (FIGS. 4A, 4B, 5A-5E) as discussed above.

Figures 8A, 8B:
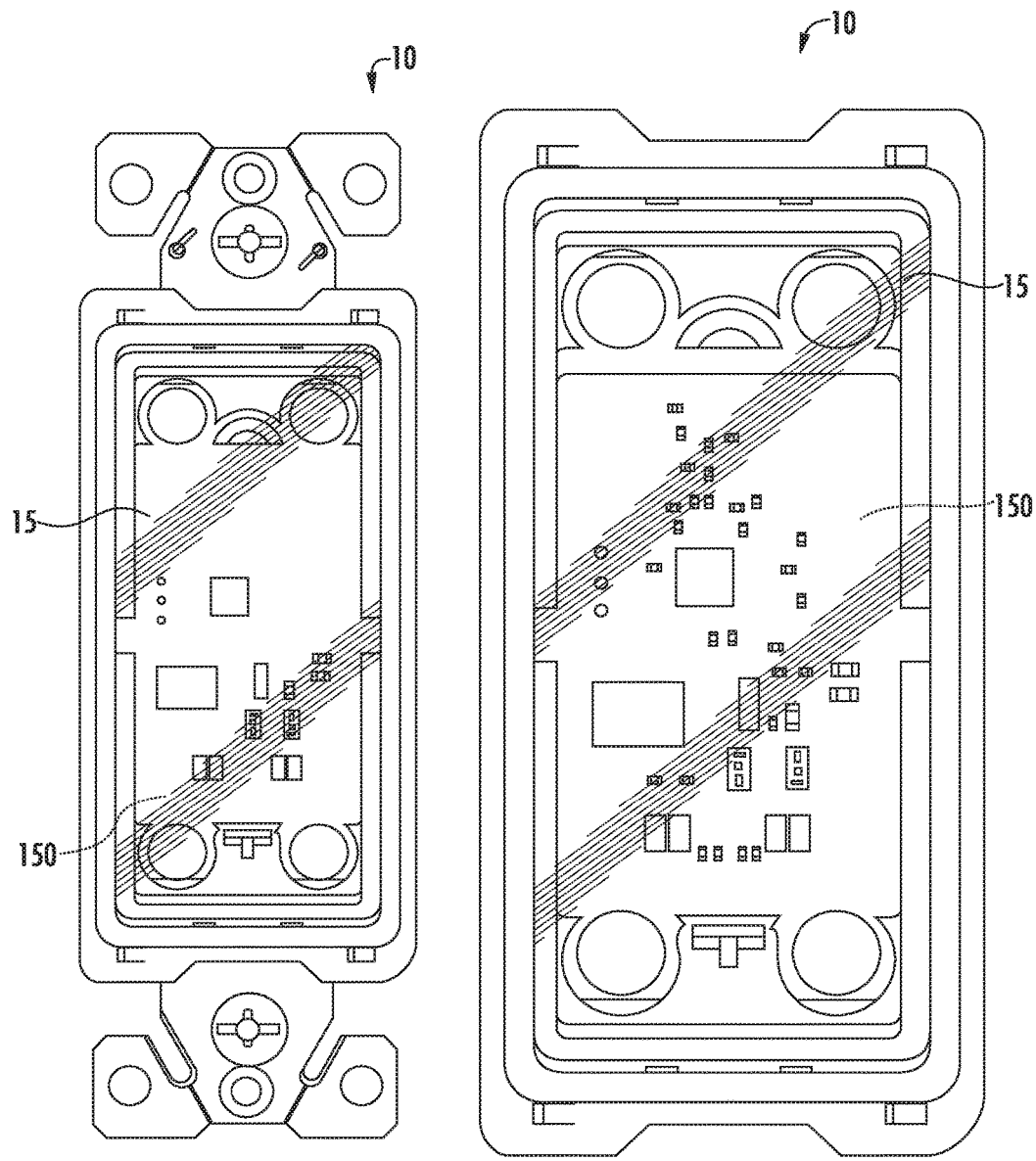
FIGS. 8A and 8B are greatly enlarged top views of switches according to embodiments of the present invention.

The at least one circuit board 150 can comprise a rectangular shape as shown in FIGS. 5B, 7A, 7B, 8A and 8B. The user input member 15 can have at least a portion that is visually transmissive, such as transparent or translucent. As shown in FIGS. 8A and 8B, the entire user input member can be visually transmissive and the at least one circuit board 150 can be visually seen by a user as shown in FIGS. 8A and 8B. In some particular embodiments, the at least one circuit board 150 can be a single circuit board.

Figure 5C:
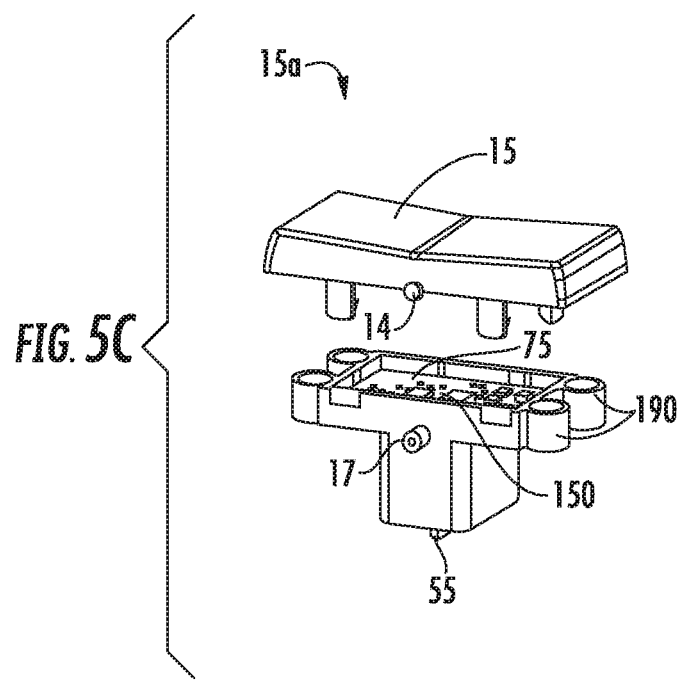
FIG. 5C is a partial assembly view of the sub-assembly shown in FIG. 5B.
Figure 5D:
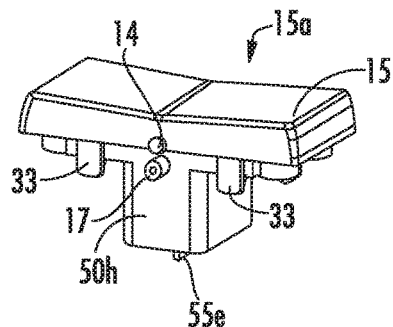
FIG. 5D is a side perspective assembled view of the sub-assembly shown in FIG. 5B.
Figure 5E:
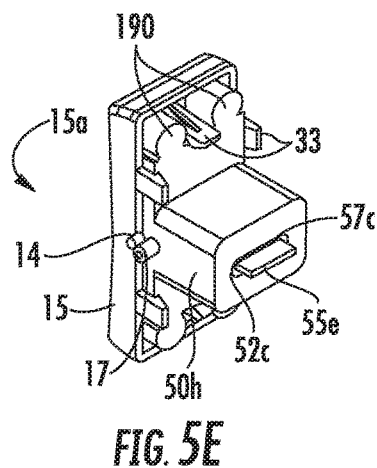
FIG. 5E is a bottom perspective assembled view of the toggle and magnet housing sub-assembly shown in FIG. 5B.

As shown in FIG. 5B-5E, in some embodiments the switch 10 includes a toggle and magnet housing sub-assembly 15a. The terminals 59 of the coil 52 can be attached to the at least one printed circuit board 150. This package 50p (FIG. 5B) can be inserted into the magnet housing 50h with the printed circuit board 150 in the cavity 75 (FIG. 5C). The user input member 15 can then be press-fit attached to the magnet housing 50h (FIG. 5D, 5E) to form the sub-assembly 15a.

The magnet housing 50h can comprise curvilinear ends 190 (which may be shaped as semicircular ears) that engage the attachment members 33 of the user input member 15.

As shown in FIG. 7A, the at least one circuit board 150 can include a transmitter 260 and a power generator harvesting circuit 270.

Figure 18:
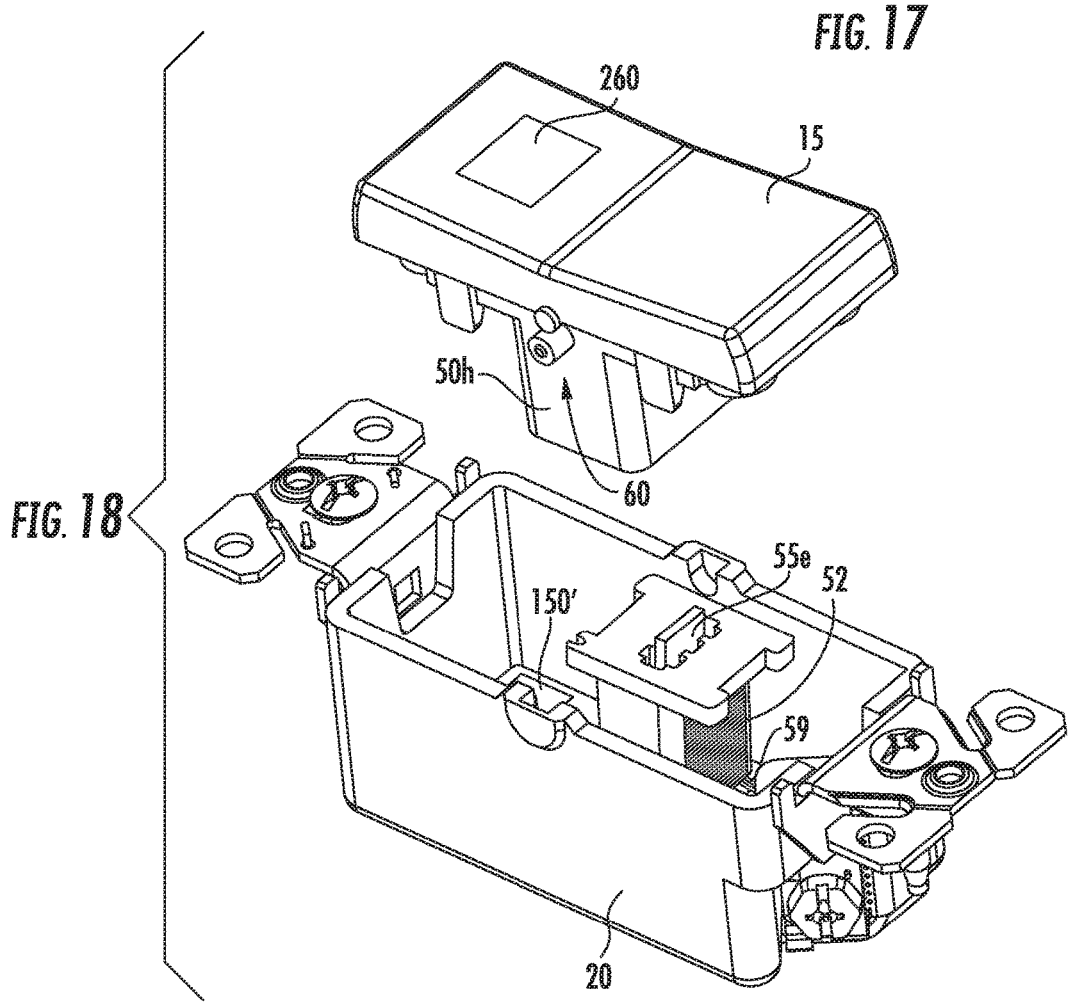
FIG. 18 is a side perspective view of an alternate embodiment of a self-powered switch according to embodiments of the present invention.

As shown in FIG. 18, it is also contemplated that the permanent magnet 60 and plates 62 can be held by the magnet housing 50h and move (based on the spindle attachment to the housing 20) relative to the coil 52 and shaft 55, which can be stationary. The coil 52 can be held in the bottom housing 22 aligned with a medial portion of the user input member 15 under the magnet 60. The at least one printed circuit board 150' can reside under the coil 52 and terminals 59 can extend longitudinally outward and/or below the coil 52. The transmitter 260 can reside closer to the user input member 15 than the coil 52.

FIGS. 9A and 9B illustrate an exemplary remote receiver 200 that can be wirelessly operated by the switch 10. The receiver 200 can include a base 201, a cover 202, an indicator light 206 and a switch match code member 210. The indicator light 206 can reflect active or inactive status based on the ON or OFF configuration of the switch 10, for example. The switch match code member 210 can be configured to recognize signal from a particular switch or the switch can be coded to work with only corresponding receiver(s) having a match where more than one switch 10, or a different toggle 15 of a single switch 10, may be used for different purposes and/or different lights, for example.

FIG. 10 illustrates one exemplary application of the switch 10 in a commercial or residential building as a switch 10 that wirelessly directs the receiver 200 to turn the light 240 ON and OFF, for example.

Figure 11:
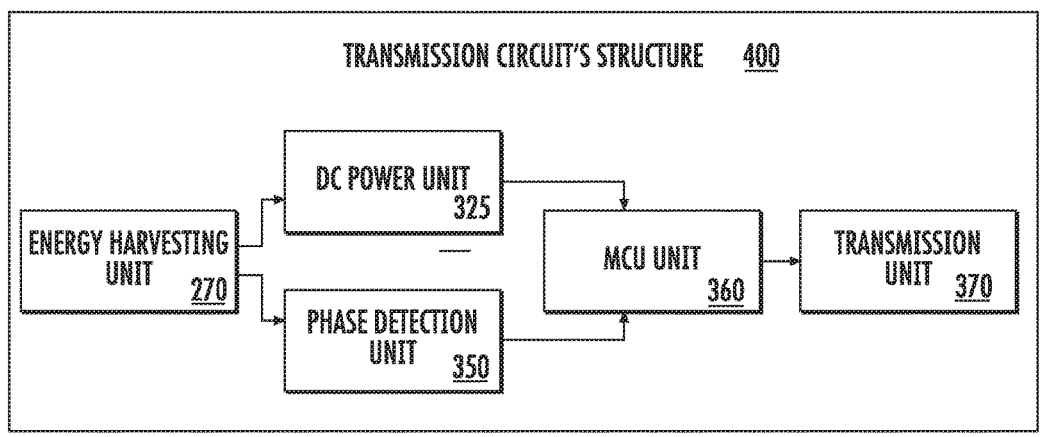
FIG. 11-FIG. 17 are circuit diagrams of the switch and receiver circuits according to embodiments of the present invention.

FIG. 11 is a schematic illustration of a transmission circuit 400 with an energy harvesting unit 270, a DC power unit 325, a phase detection unit 350 an MCU unit (processor) 360 and a transmission unit 370. For clarity, it is noted that the term "unit" when referring to the circuit structures of FIGS. 11-17, for example, is used for ease of discussion to refer to circuits or sub-circuits and may be distributed or held on a single component, i.e., substrate or printed circuit board and which may share components of other units (circuits or sub-circuits).

Figure 12:
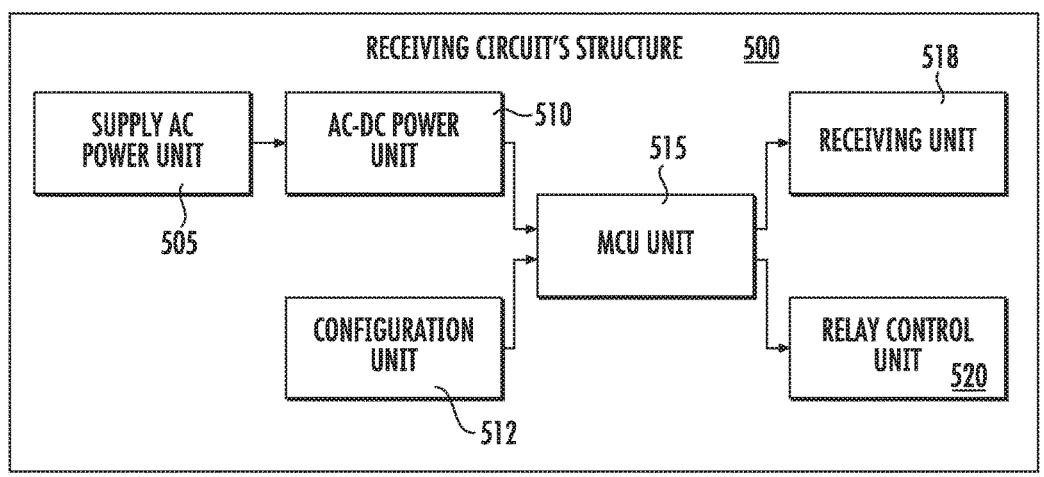

FIG. 12 is a schematic illustration of a receiving circuit 500 for the receiver 200. The receiving circuit 500 can include a supply AC power unit 505, an AC-DC power unit 510, a configuration unit 512, an MCU unit 515, a receiving unit 518, and a relay control unit 520.

Figure 13:
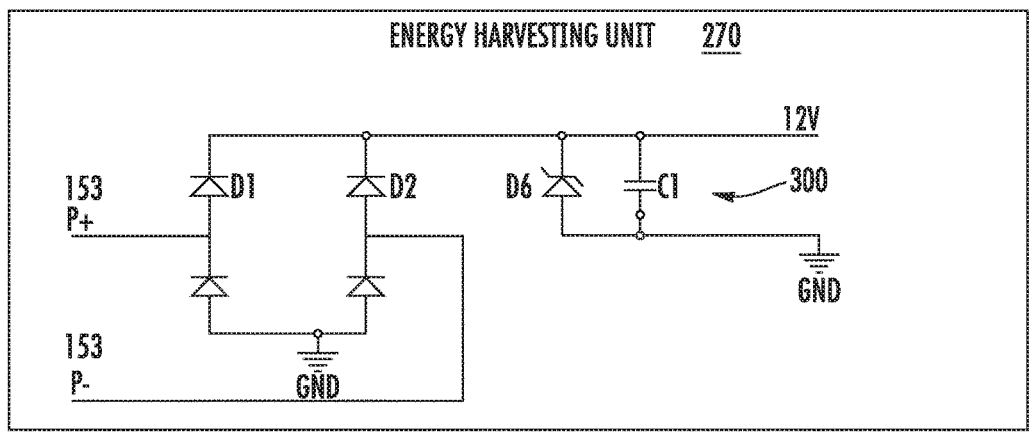

FIG. 13 is an example of an energy harvesting unit 270 for the transmission circuit 400 (FIG. 11) and can include at least one power storage capacitor 300 and power inputs 153 (P+ and P− from the coil 52).

Figure 14:
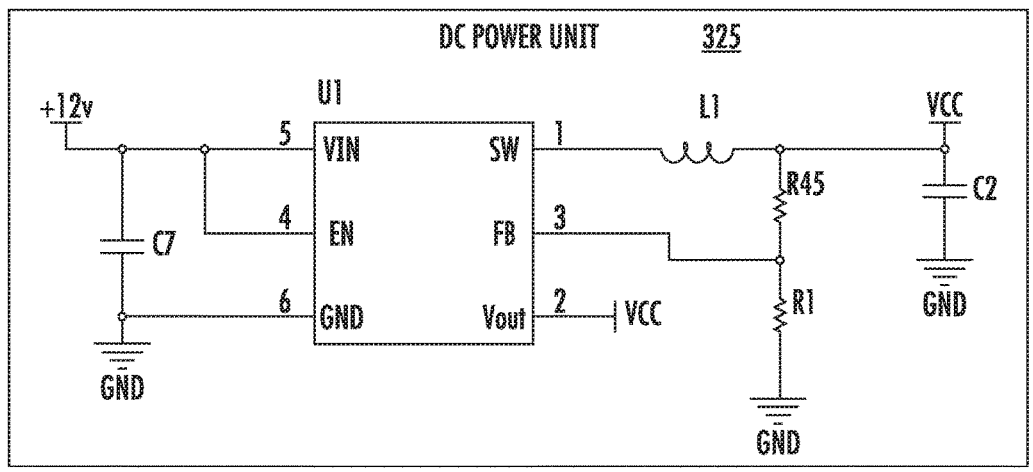

FIG. 14 is an example of a DC power unit 325 for the transmission circuit 400 (FIG. 11).

Figure 15:
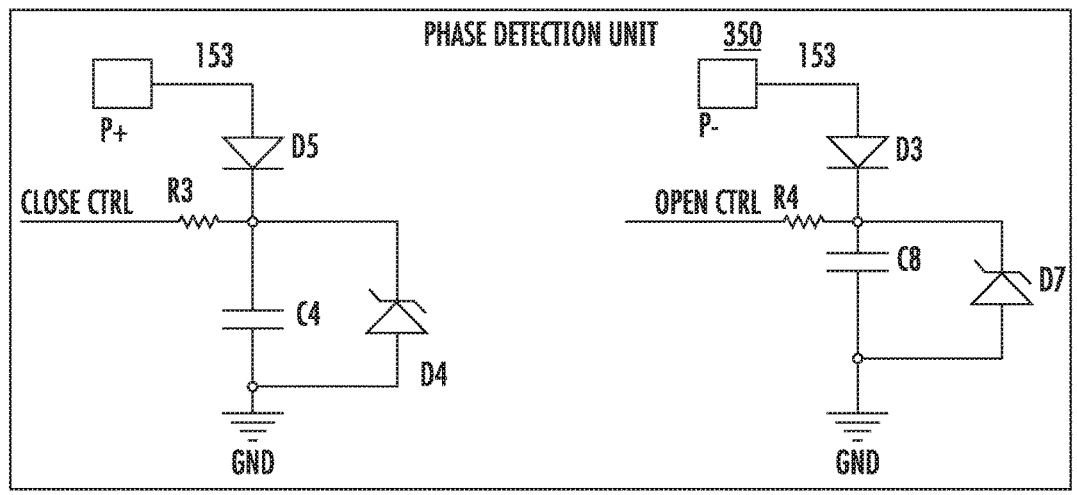

FIG. 15 is an example of a phase detection unit 350 for the transmission circuit 400 (FIG. 11).

Figure 16:
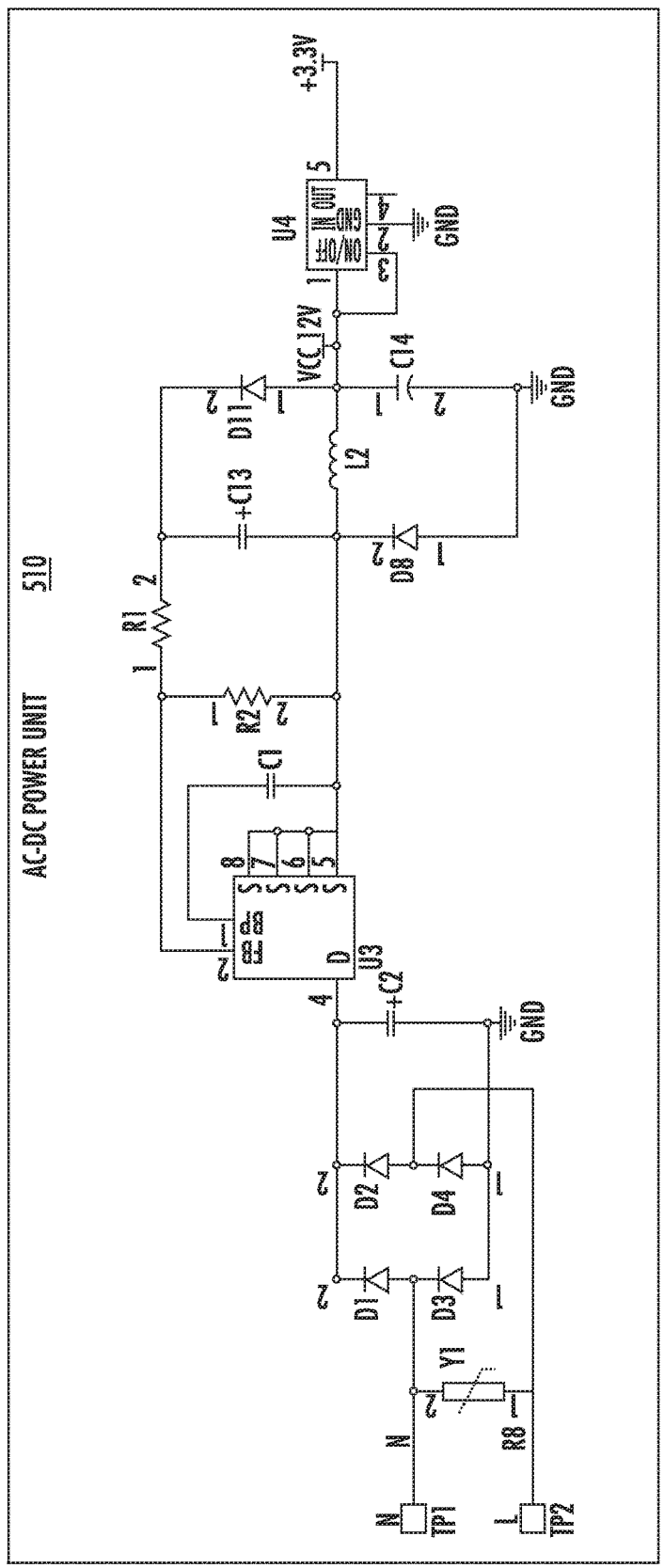

FIG. 16 is an example AC-DC power unit 510 of the receiving circuit 500 (FIG. 12).

Figure 17:
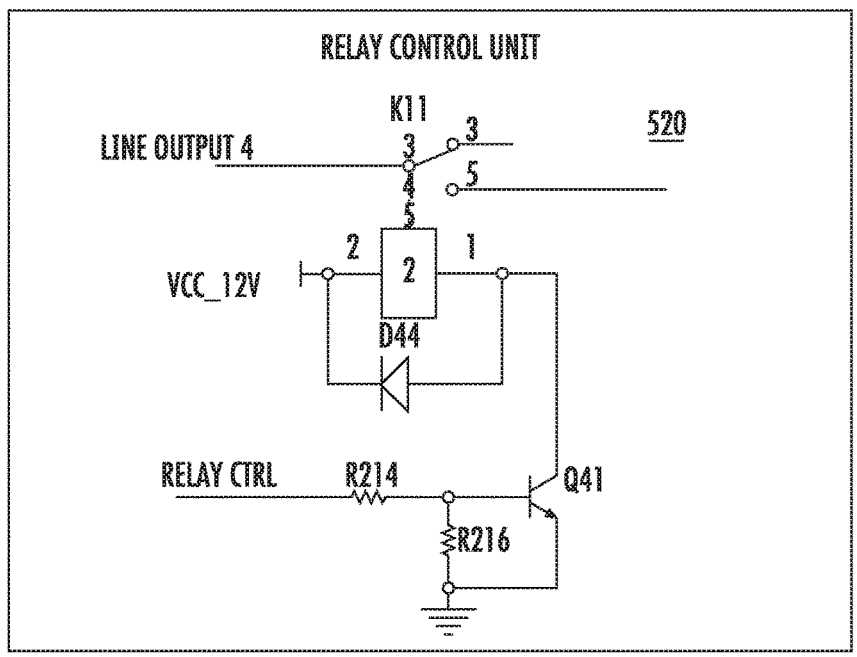

FIG. 17 is an example of a relay control unit 520 of the receiving circuit 500 (FIG. 12).

The self-powered switch 10 can provide power based on the movement of the user input member which, in turn, moves one or both of the coil 52 relative to the permanent magnet 60. By way of example, only, the self-generated power can be based on electromotive forces generated by operation (in response to) movement of the user input member 15 (to move one or both of the permanent magnet 60 and/or coil 52 relative to one another) based on the below theory of operation.

$$u = N * A * dB/dt \quad \text{(Equation 1)}$$

Induced electromotive force: u
Coil turn numbers: N (N can be any suitable number, typically between 10-10,000)
Sectional area: A
Electromagnetic induction strength: B
Time: t (1) When the self-powered switch's user input member 15 stops movement, the coil 52 stops movement and the coil's dB/dt is 0, so the induced electromotive force u is 0.

(2) When the user input member 15 moves, the coil 52 moves, and the coil's dB/dt changes, so that the induced electromotive force u has a value, this induced electromotive force u can be used to generate power (i.e., be directed to a full wave rectifier "D1, D2" per FIG. 13 to generate DC power/energy). At least one capacitor in the switch 10 can store this DC energy (optionally a single capacitor 300, FIG. 13). The storage capacitor's DC voltage can be between 1-10V for between 2 ms-10 ms, typically about 5V for about 3 ms. The coil 52 through power connections 59 to the power connectors 153 can provide DC voltage of between 1-10V, typically about 5V, for between 2-10 ms, typically about 4 ms, to provide a stable electronic operation.

Referring to FIGS. 13-17, schematic illustrations of different switch positions for the self-powered switch operation are shown. In FIG. 15, P+ and P− connections 153 connect to the coil's two terminals 59. When the user input member 15 is in an ON position, P+ is high voltage, net "Close_ctrl" will be high voltage, net "Close_ctrl" connects a processor 360 (also called a "MCU") I/O pin, the processor will detect this high voltage, and the processor can control a relay (FIG. 17) to close "line_output" and "line_input", so that a load will have AC power.

When the user input member 15 is in an OFF position, P− is high voltage, net "Open_ctrl" will be high voltage, net "Open_ctrl" connects the I/O pin of the MCU 360, MCU will detect this high voltage, MCU will control the relay to open "line_output" and "line_input", load will not have AC power.

The switch 10 can be provided as a single switch package or form factor or may be provided as a dual or triple side-by-side switch package (not shown). In some embodiments, the switch 10 can be configured as an in-wall mount single gang, dual gang or other multiple gang switch body.

The permanent magnet 60 and/or coil 52 and shaft 55 can have a range of motion relative to each other that is sufficient to induce a voltage to power the transmitter for 1-10 ms, typically from 2-5 ms.

Figure 19:
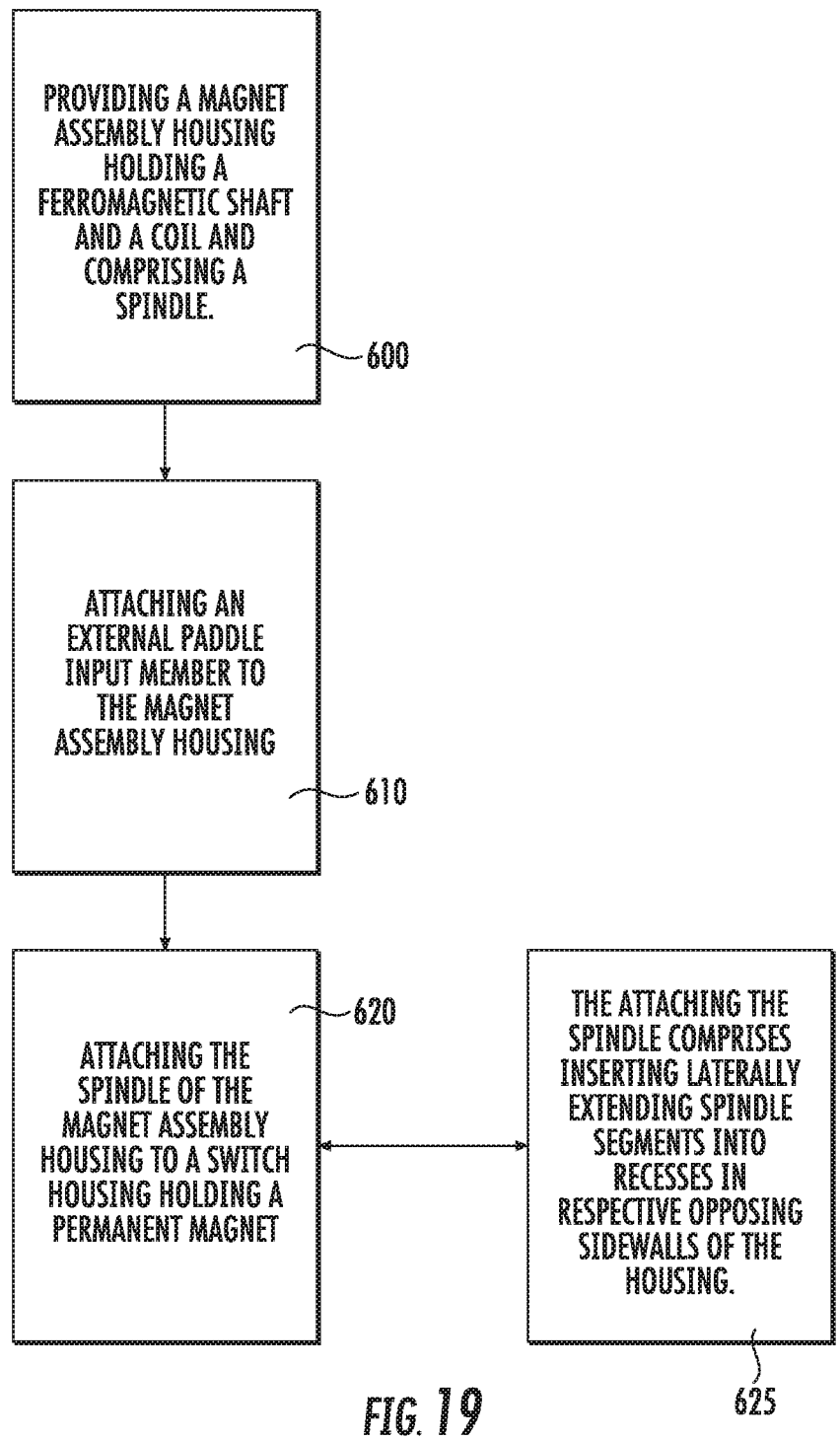
FIG. 19 is a flow chart of exemplary operations that can be used to assemble a self-powered switch assembly according to embodiments of the present invention.

FIG. 19 illustrates exemplary operations that can be used to assemble a self-powered switch according to embodiments of the present invention. A magnet assembly housing holding a ferromagnetic shaft and a coil and comprising a spindle is provided (block 600). An external paddle input member is attached to the magnet assembly housing (block 610). The spindle of the magnet assembly housing is attached to a switch housing holding a permanent magnet (block 620).

The attaching the spindle can be carried out by inserting laterally extending spindle segments into recesses in opposing sidewalls of the housing (block 625).

The magnet housing can also hold at least one printed circuit board above the shaft and terminals of the coil can be attached to the at least one printed circuit board.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A self-powered switch, comprising:
   an externally accessible user input member;
   a switch housing attached to the user input member;
   a permanent magnet held in the switch housing;
   a magnet housing held in the switch housing, wherein the magnet housing is attached to the user input member and is pivotably attached to the switch housing via at least one spindle, and wherein the magnet housing resides under a medial portion of the user input member; and
   a magnet assembly comprising a coil and a shaft extending a distance beyond the coil held in the switch housing,
   wherein at least one of the magnet assembly and permanent magnet moves in response to movement of the user input member to thereby induce a voltage to power a transmitter associated with the switch.

2. The switch of claim 1, wherein the at least one spindle comprises first and second spindle segments that extend laterally outward from opposing sides of a medial portion of an upper portion of the magnet housing and engage receiving channels in opposing sidewalls of the switch housing.

3. The switch of claim 1, further comprising at least one circuit board in the switch housing and comprising first and second electrical connections attached to first and second terminals of the coil.

4. The switch of claim 1, wherein the user input member is a rectangular toggle, wherein the user input member is affixed to the magnet housing and defines a unitary subassembly therewith, wherein the magnet housing and the user input member pivot in concert about the at least one spindle between on and off positions of the switch, wherein the toggle has a perimeter comprising a pair of long sides and a pair of short sides, and wherein the at least one spindle comprises laterally outwardly extending spindle segments that extend outward from a medial segment of opposing sides of the magnet housing.

5. The switch of claim 1, wherein the user input member comprises laterally outwardly extending first and second shaft segments residing above and adjacent corresponding first and second spindle segments of the at least one spindle.

6. The switch of claim 1, wherein the magnet housing has an outer wall that has an upper portion that surrounds a rectangular cavity that holds a printed circuit board with a transmitter under the user input member, wherein the upper portion merges into a lower portion that holds the coil, and wherein the at least one spindle extends laterally outward from the upper portion of the outer wall.

7. The switch of claim 1, wherein the magnet housing holds the magnet assembly with the coil aligned with the medial portion of the user input member, wherein the coil has a perimeter with a pair of opposing long sides joined by a pair of opposing short sides, wherein the shaft is an elongate plate that extends through the coil, and wherein the permanent magnet comprises a rare earth magnet.

8. The switch of claim 1, wherein the switch housing is rectangular and comprises mounting brackets extending off each long end, and wherein the switch housing is an in-wall mountable housing.

9. The switch of claim 1, wherein the magnet housing holds the magnet assembly with the coil and shaft, wherein the permanent magnet is held between spaced apart first and second plates that rise a distance above the permanent magnet to provide a cavity above the permanent magnet in the switch housing, and wherein an end of the shaft extends into the cavity and serially pivots to contact inner surfaces of the first and second plates to alter magnetic flux from the coil to the permanent magnet in response to movement of the user input member.

10. The switch of claim 1, further comprising:
a top member and a bottom member held in the magnet housing, wherein the top member and bottom member hold the coil of the magnet assembly therebetween, the top member and bottom member comprising channels that align with a coil channel to provide a shaft channel that allows the shaft to extend below the bottom member a distance into the cavity, and wherein the top member comprises at least one coil terminal aperture through which first and second terminals of the coil extend; and
first and second magnet yoke members held in the magnet housing that attach to the top member and the bottom member on opposing sides of the coil.

11. The switch of claim 1, wherein the switch housing comprises a mid-housing and a bottom housing, wherein the user input member has a perimeter with a pair of long sides and a pair of short sides, wherein the user input member also comprises a plurality of attachment members extending from the long and short sides that engage the magnet housing, wherein the mid housing has a rectangular perimeter with a pair of long sides joined by a pair of short sides that surround a rectangular open interior space, and wherein the mid housing comprises first and second attachment members that extend off opposing short sides thereof that attach to the bottom housing.

12. A self-powered switch, comprising:
an externally accessible user input member;
a switch housing attached to the user input member;
a permanent magnet held in the switch housing;
a magnet housing held in the switch housing, wherein the magnet housing is attached to the user input member and pivotably attached to the switch housing via at least one spindle;
a magnet assembly comprising a coil and a shaft extending a distance beyond the coil held in the switch housing; and
at least one circuit board in the switch housing and comprising first and second electrical connections attached to first and second terminals of the coil,
wherein at least one of the magnet assembly and permanent magnet moves in response to movement of the user input member to thereby induce a voltage to power a transmitter associated with the switch,
wherein the at least one circuit board includes a circuit board that is held by the magnet housing above the shaft and under the user input member, wherein the at least one circuit board comprises an energy harvesting circuit in electrical communication with the coil terminals and at least one capacitor for storing voltage sufficient to power the transmitter, and wherein the transmitter is a wireless transmitter that wirelessly communicates with a remote receiver associated with an electrical appliance.

13. A self-powered switch, comprising:
an externally accessible user input member;
a switch housing attached to the user input member;
a permanent magnet held in the switch housing;
a magnet housing held in the switch housing, wherein the magnet housing is attached to the user input member and pivotably attached to the switch housing via at least one spindle; and
a magnet assembly comprising a coil and a shaft extending a distance beyond the coil held in the switch housing,
wherein at least one of the magnet assembly and permanent magnet moves in response to movement of the user input member to thereby induce a voltage to power a transmitter associated with the switch,
wherein the housing comprises a bottom housing with a magnet cradle held therein and a mid-housing that is attached to the bottom housing under the user input member, and wherein the mid-housing and bottom housing have arcuate recesses that align and face each other to form laterally spaced apart and opposing pairs of circular channels that hold spindle segments of the at least one spindle.

14. The switch of claim 13, wherein the magnet housing has a rectangular primary body that holds the coil and shaft therein, wherein the at least one spindle comprises laterally spaced apart first and second spindle segments that extend outward from the magnet housing, and wherein the user input member has laterally spaced apart first and second shaft segments that are adjacent and above the first and second spindle segments.

15. A self-powered switch, comprising:
an externally accessible user input member;
a switch housing attached to the user input member;
a permanent magnet held in the switch housing;
a magnet housing held in the switch housing, wherein the magnet housing is attached to the user input member and pivotably attached to the switch housing via at least one spindle;
a magnet assembly comprising a coil and a shaft extending a distance beyond the coil held in the switch housing; and a top member and a bottom member held in the magnet housing, wherein the top member and bottom member hold the coil therebetween, the top member and bottom member comprising channels that align with a coil channel to provide a shaft channel that allows the shaft to extend below the bottom member a distance into the cavity, and wherein the top member comprises at least one coil terminal aperture through which the coil terminals extend to connect to power input terminals on a printed circuit board, wherein at least one of the magnet assembly and permanent magnet moves in response to movement of the user input member to thereby induce a voltage to power a transmitter associated with the switch, wherein the magnet housing holds the magnet assembly with the coil and shaft, wherein the permanent magnet is held between spaced apart first and second plates coupled to the bottom member that rise a distance above the permanent magnet to provide a cavity above the permanent magnet in the switch housing, and wherein an end of the shaft extends into the cavity and serially pivots to contact inner surfaces of the first and second plates to alter magnetic flux from the coil to the permanent magnet in response to movement of the user input member.

16. A self-powered switch, comprising:
an externally accessible user input member;
a switch housing attached to the user input member;
a permanent magnet held in the switch housing;
a magnet housing held in the switch housing, wherein the magnet housing is attached to the user input member and pivotably attached to the switch housing via at least one spindle; and
a magnet assembly comprising a coil and a shaft extending a distance beyond the coil held in the switch housing, wherein at least one of the magnet assembly and permanent magnet moves in response to movement of the user input member to thereby induce a voltage to power a transmitter associated with the switch, wherein the permanent magnet is a rare earth magnet that is rectangular with a pair of long sides joined by a pair of short sides, and wherein the long sides extend in a lateral dimension of the switch housing across between 50-100% of a lateral extent of the switch housing.

17. A method of assembling a self-powered switch, comprising:
providing a user input member;
providing a magnet housing comprising a spindle;
providing a switch housing; and
attaching the spindle to the switch housing then attaching the user input member to the magnet housing or attaching the user input member to the magnet housing then attaching the spindle to the switch housing, wherein the attaching the spindle is carried out by inserting laterally extending spindle segments into recesses in opposing sidewalls of the housing, and wherein the magnet housing comprises a printed circuit board held above the magnet housing and attached to coil terminals of a coil held in the magnet housing.

18. The method of claim 17, wherein the magnet housing holds a coil and a shaft extending through the coil and the switch housing holds a permanent magnet.

19. The method of claim 17, wherein the magnet housing holds a permanent magnet and the switch housing holds a coil and a shaft extending through the coil.

20. The method of claim 17, wherein the user input member is visually transmissive.

\* \* \* \* \*